United States Patent [19]
Park

[11] Patent Number: 5,949,511
[45] Date of Patent: *Sep. 7, 1999

[54] LIQUID CRYSTAL DISPLAY

[75] Inventor: Jong Jin Park, Seoul, Rep. of Korea

[73] Assignee: LG Electronics Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/969,927

[22] Filed: Nov. 14, 1997

[51] Int. Cl.$^6$ .................... G02F 1/1343; G02F 1/1339
[52] U.S. Cl. .......................... 349/139; 349/155
[58] Field of Search .................. 349/42, 139, 141, 349/143, 149, 155

[56] References Cited

U.S. PATENT DOCUMENTS

| | | | |
|---|---|---|---|
| 4,568,149 | 2/1986 | Sugata et al. | 349/42 |
| 4,937,566 | 6/1990 | Clerc | 349/42 |
| 5,307,189 | 4/1994 | Nishiki et al. | 349/143 |
| 5,338,240 | 8/1994 | Kim | 349/155 |
| 5,767,936 | 6/1998 | Sugimura | 349/143 |

Primary Examiner—William L. Sikes
Assistant Examiner—Dung Nguyen
Attorney, Agent, or Firm—Morgan, Lewis & Bockius LLP

[57] ABSTRACT

A liquid crystal display device according to the present invention comprises a first substrate and second substrate, a plurality of gate bus lines and data bus lines crossing each other over the first substrate, the gate bus lines and data bus lines defining a pixel region, a plurality of thin film transistors at the cross of the gate bus lines and the data bus lines, at least one pair of first data and common electrodes, which are parallel to the data bus lines, forming an electric field in the pixel region, a first alignment layer over the first substrate, at least one pair of second data and common electrodes forming an electric field on the second substrate, a second alignment layer over the second substrate, and a liquid crystal layer between the first substrate and second substrate.

32 Claims, 4 Drawing Sheets

LIQUID CRYSTAL DISPLAY

BACKGROUND OF THE INVENTION

This invention relates to a liquid crystal display device, more particularly, to an in-plane switching mode liquid crystal display device having a plurality of electrodes formed on its the upper and lower substrate.

Recently, the TN-LCDs have been extensively used in devices such as the portable personal computer, measurement apparatus and the like. However, TN-LCDs, while having a number of advantages, also have the disadvantages of a narrow viewing angle and low response time.

To solve this problem, a multi-domain LCD such as a two-domain TN LCD(TDTN LCD) and a domain divided TN LCD(DDTN LCD), and a TN LCD including an optical compensation film have been introduced. In this LCD, however, a contrast ratio is decreased and a color shift is generated according to a viewing direction.

Further for the purpose of a wide viewing angle, an in-plane switching mode LCD is also proposed.

FIG. 1 is a plan view of TFT array substrate of the conventional in-plane switching mode LCD. As shown in figure, data electrodes 5 and common electrodes 6, which are applying electric field to the liquid crystal layer, are arranged in the pixel region defined by a gate bus line 1 and a data bus line 2 crossing each other. At the cross of the gate bus line I and the data bus line 2, the thin film transistor on which a gate electrode 3 and source/drain electrodes 4 are respectively connected to the gate bus line 1 and the data bus line 2 is positioned. When the voltage is applied to the data electrodes 5 and the common electrodes 6, the electric field is created in plane of the surface of the substrate. In the in-plane switching mode LCD, in other word, the liquid crystal molecules are rotated in plane of the surface of the substrate. Thus, the angular dependence problem caused by the refractive anisotropy of the liquid crystal molecule is lowered, namely a wide viewing angle could be achieved.

FIG. 2a is a sectional view taken along line A–A' of the FIG. 1, as shown in figures, a gate insulator 15 is formed on the common electrode 6 formed on a first substrate 10. The data bus line 2 and the data electrode 5 are formed on the gate insulator 15. A passivation layer 16 is formed on the data bus line 2 and the data electrode 5, and a first alignment layer 21a is formed on the passivation layer 16. Further a black matrix 8 is formed on a second substrate 11 to prevent the light leakage onto the gate bus line 1, the data bus line 2, and TFT. A color filter layer 17 is formed on the second substrate 11. A second alignment layer 21b is formed on the color filter layer 17. A liquid crystal layer 19 is formed between the first substrate 10 and the second substrate 11. Further a polarizer 25 is attached on the first substrate 10, and an analyzer 26 is attached on the second substrate 11 in which optical axes of the polarizer 25 and analyzer 26 are orthogonal perpendicular to each other.

Accordingly as shown in FIG. 2a, when an electric field is not generated between the data electrode 5 and the common electrode 6, the light is not transmitted in the liquid crystal layer 19 because liquid crystal molecules are parallel to polarization axes of the polarizer 25.

While, when an electric field is generated, as shown in FIG. 2b, between the data electrode 5 and the common electrode 6, the light is transmitted in the liquid crystal layer 19 because the long axis directions of the liquid crystal molecules depart from polarization axes of the polarizer 25.

In this in-plane switching mode LCD, however, since the data electrode 5 and common electrode 6 are formed on the first substrate 10, it is impossible to obtain an uniform electric field in the whole liquid crystal layer 19.

Therefore, it is necessary to provide a large driving voltage in order to sufficiently drive the liquid crystal molecules 20.

Further the contrast ratio is decreased according to viewing direction because the electric field is not parallel around the data electrode 5 and the common electrode 6 by an inclined alignment of the liquid crystal molecule according to the electric field.

SUMMARY OF THE INVENTION

It is an object of the present invention to provide an in-plane switching mode liquid crystal display device having a plurality of electrodes formed on its the upper and lower substrate.

It is another object of the present invention to provide a high contrast ratio by providing the uniform electric field into the liquid crystal layer.

In order to achieve the above-mentioned objects, the in-plane switching mode LCD according to the present invention comprises a first substrate and second substrate, a plurality of gate bus lines and data bus lines crossing each other over the first substrate, a plurality of thin film transistors at the cross of the gate bus lines and the data bus lines, a plurality of first data and common electrodes formed on the first substrate, a first passivation layer over the total area of the first substrate, a first alignment layer formed on the passivation layer, a plurality of second data and common electrodes formed on the second substrate, a second passivation layer over the total area of the second substrate, and a liquid crystal layer formed between the first substrate and second substrate.

Further, a conductive spacer is provided between the first data electrode and the second data electrodes, and the first common electrode and the second common electrode, thereby the above electrodes are electrically connected when a voltage is applied into the liquid crystal layer. The spacer is placed by depositing after applying direct current, or by depositing after blocking the substrate with a mask.

DETAILED DESCRIPTION OF THE INVENTION

Preferred embodiments of the present invention are described in detail hereinafter by accompanying FIG. 3 to FIG. 4.

Figure 1:
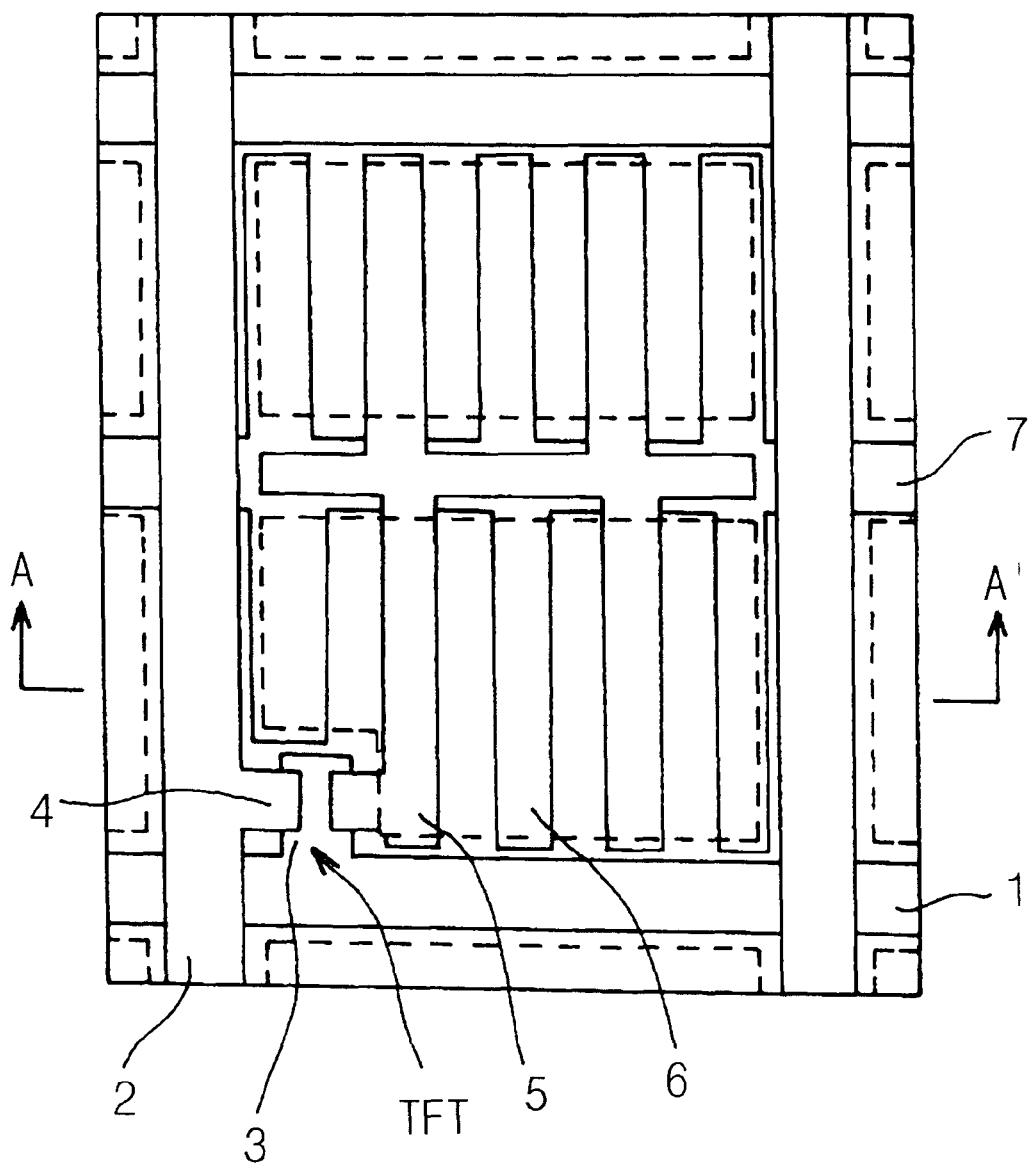
FIG. 1 is a plan view of TFT array substrate of the conventional in-plane switching mode LCD.
Figure 2A:
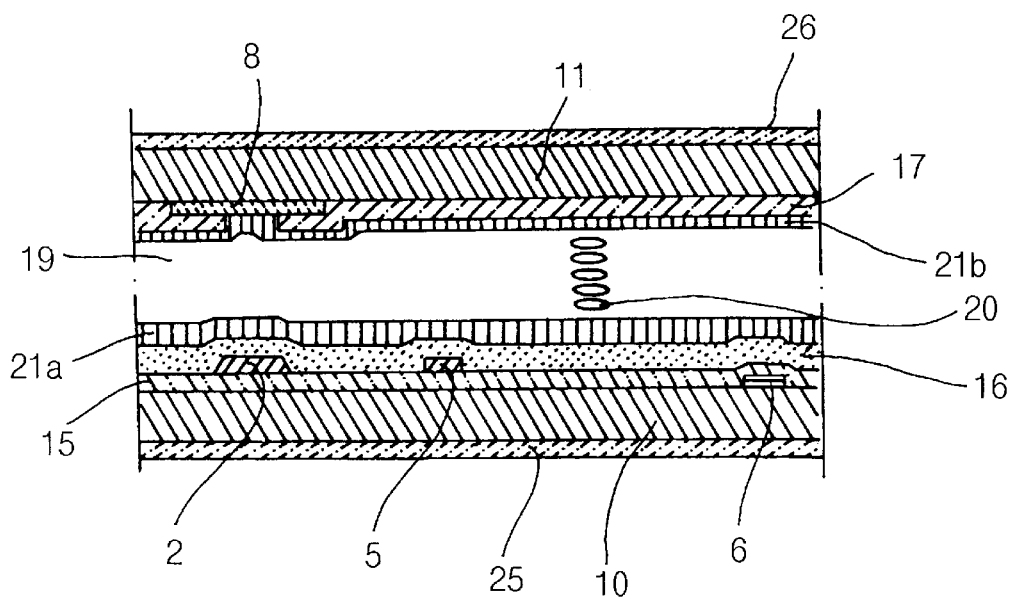
FIG. 2a is a sectional view taken along line A–A' of the FIG.1.
Figure 2B:
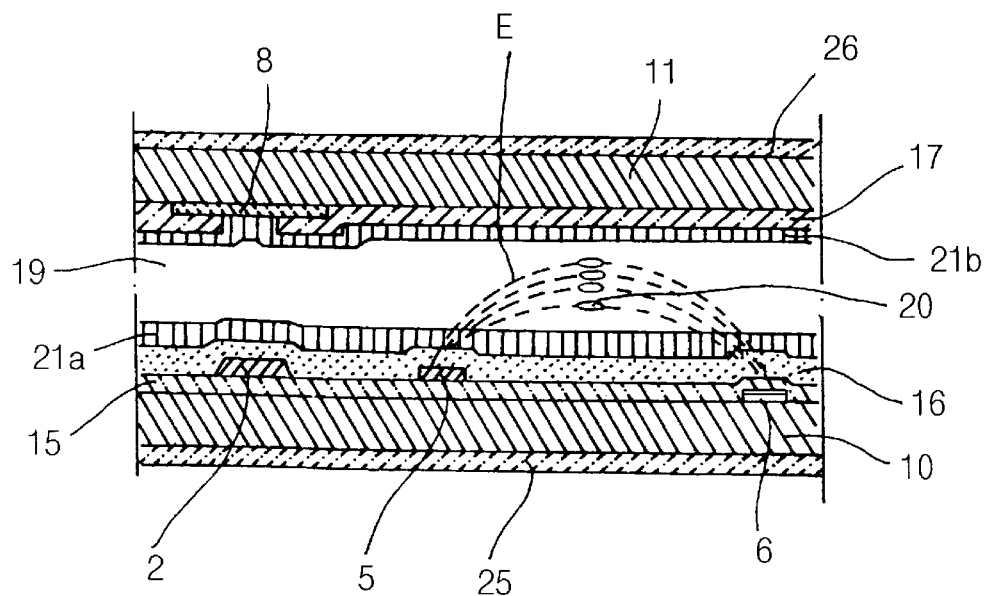
FIG. 2b is a drawing showing the conventional in-plane switching mode LCD in state that an electric field is generated.
Figure 3:
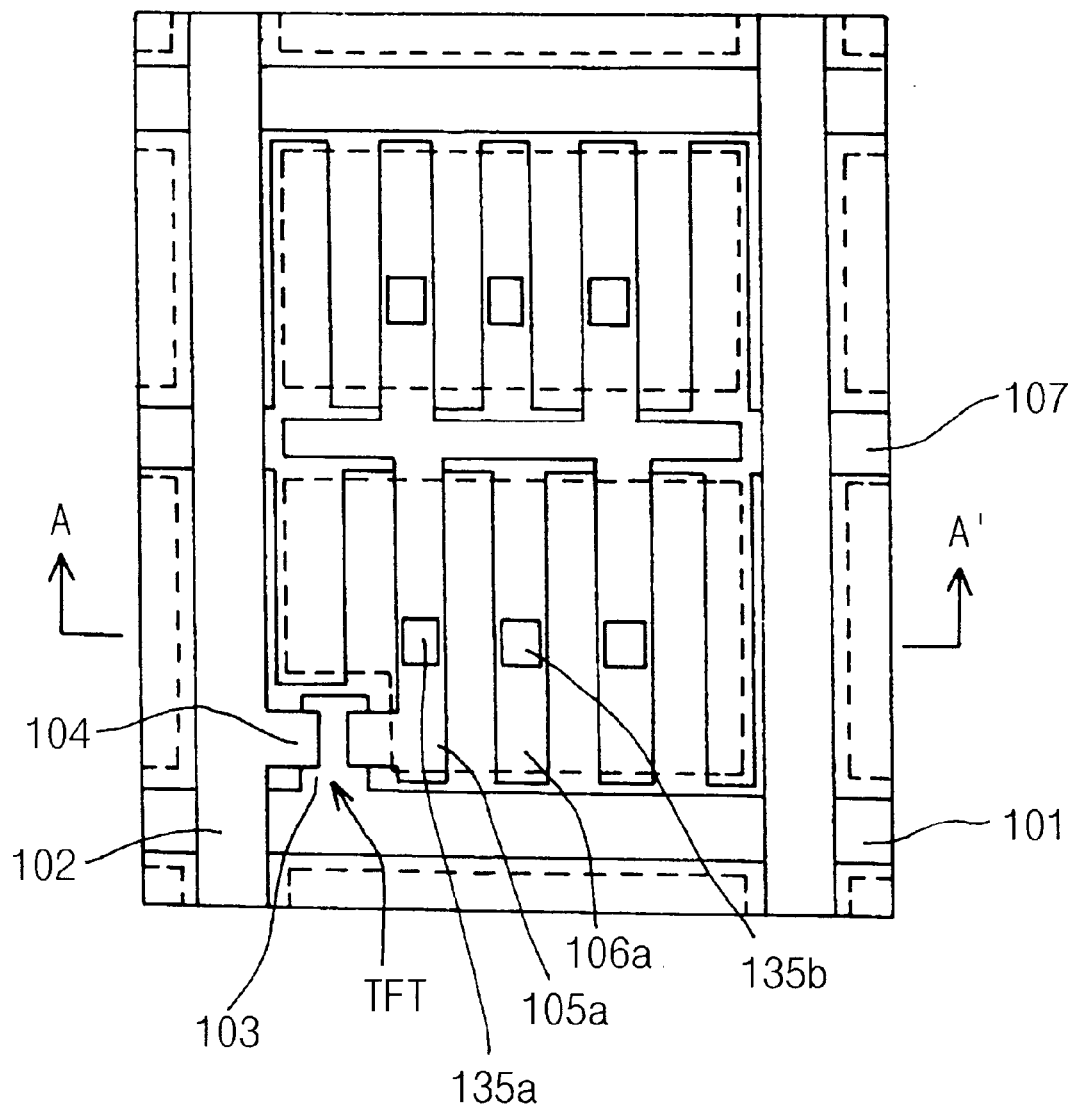
FIG. 3 is a plan view of TFT array substrate of the present in-plane switching mode LCD.
Figure 4A:
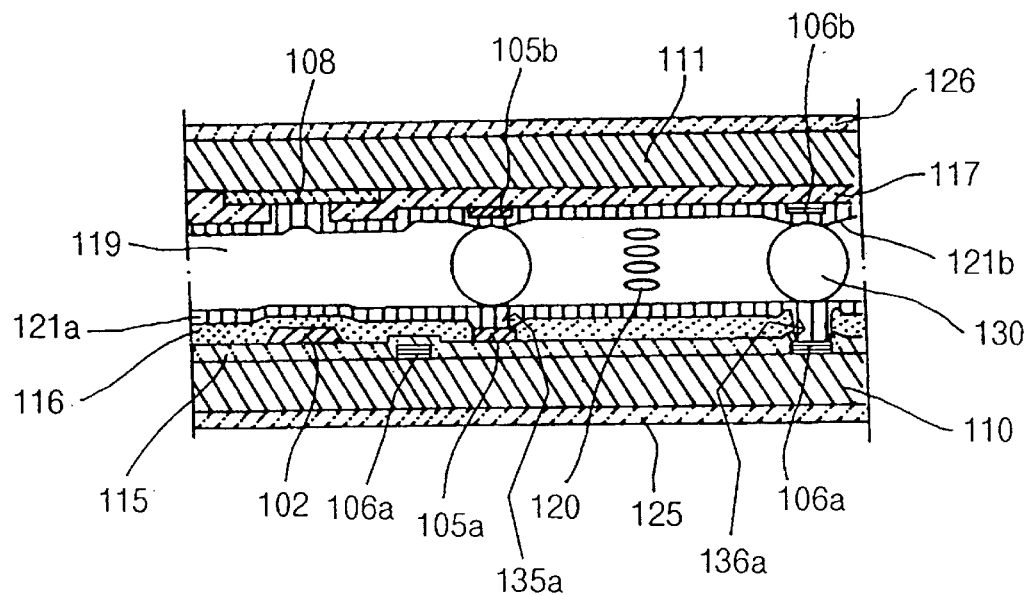
FIG. 4a is a sectional view taken along line A–A' of the FIG. 3.
Figure 4B:
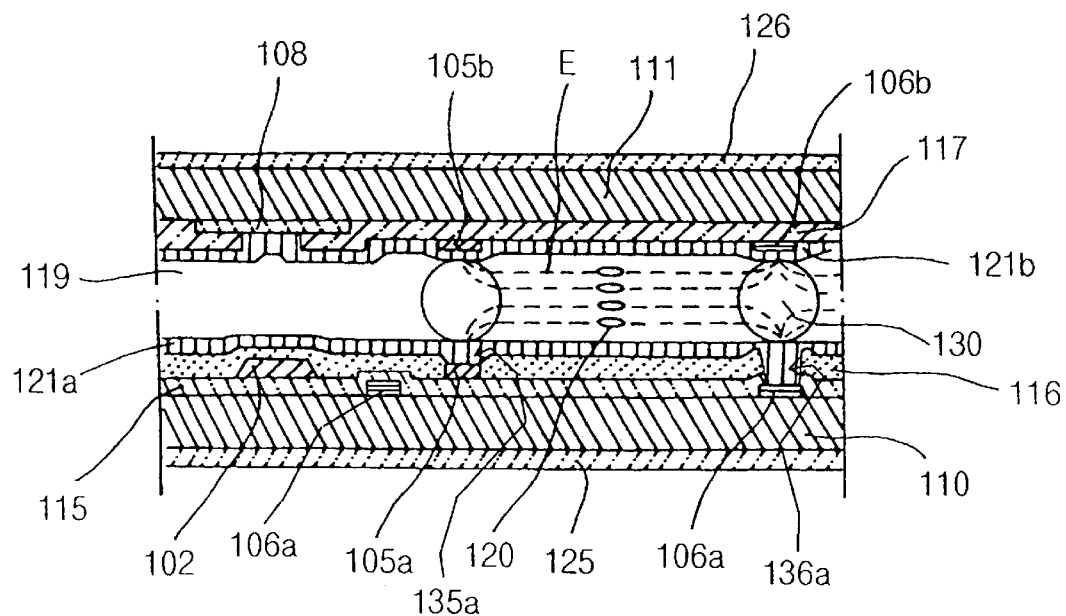
FIG. 4b is a drawing showing the present in-plane switching mode LCD in state that an electric field is generated.

FIG. 3 is a plan view of TFT array substrate of the present in-plane switching mode LCD, FIG. 4a is a sectional view taken along line A–A' of the FIG.3, and FIG. 4b is a drawing showing the present in-plane switching mode LCD in state that an electric field is generated.

The in-plane switching mode LCD according to the present invention comprises a first substrate 110 and the second substrate 111, a plurality of gate bus lines 101 and data bus lines 102 crossing each other over the first substrate 110, a plurality of thin film transistors at the cross of the gate bus lines 101 and the data bus lines 102, a plurality of first data electrodes 105a and common electrode 106a formed on the first substrate 110 on which an opening part 135a, 135b opens the electrodes are formed, a first passivation layer 116 over the total area of the first substrate 110, a first alignment layer 121a formed on the passivation layer 116, a plurality of second data electrode 105b and common electrode 106b formed on the second substrate 111, a second alignment layer 121b over the total area of the second substrate 111, and a liquid crystal layer 119 formed between the first substrate and second substrate 111.

The data bus line 102 and the first common electrode 106a are formed by photoetching after depositing Al alloy such as AlTa, or Cr alloy, the gate insulator 115 is formed by PECVD(plasma enhanced chemical vapor deposition) method with SiNx or Siox. Also the first data electrode 105a is prevented from a short by etching a some part of that.

The first and second alignment layers 121a, 121b are formed by rubbing method using an alignment material such as polyimide, or photo alignment method using a pothosensitive material such as PSCN-F (polysiloxanefluorocinnamate) or PVCN-F (polyvinylfluorocinnamate)

In addition, a black matrix 108 is formed on a second substrate 111 to prevent the light leakage onto the gate bus line 101, the data bus line 102, and TFT over the first substrate 110. A color filter layer 117 having color filter element of R, G, and B is formed on both the black matrix 108 and the second substrate 111, the second data electrode 105b and the second common electrode 106b are formed by photoetching after depositing Al alloy such as AlTa, or Cr alloy.

Further a conductive spacer 130 is provided between the first data electrode 105a and the second data electrodes 105b, and the first common electrode 106a and the second common electrode 106b. When a voltage is applied to the electrodes, each the electrode is electrically connected. At this time although the first data electrode 105a and the first common electrode 106a is electrically connected by the opening part 135a, 135b, the first data electrode 105a and the second data electrodes 105b, and the first common electrode 106a and the second common electrode 106b are electrically connected through the gate insulator and the first alignment layer 121a by the conductive spacer 130 without the opening part 135a, 135b.

Methods of depositing the spacer 130 on the first data electrode 105a and the first common electrode 106a are the following.

It is a first method that negative charged spacers or positive charged spacers are deposited in state that a direct current is applied between the first data electrode 105a and the first common electrode 106a through TFT on the first substrate 110, The first data electrode 105a and the first common electrode 106a are polar according to applying voltage, then the spacers are deposited on the first data electrode 105a and the first common electrode 106a by the coulomb force between negative or positive charged spacers and the first data electrode 105a and the first common electrode 106a.

It is a second method that the spacers are deposited after backing the first substrate 110 with a mask. At this time, the mask is patterned with the same shape of the first data electrode 105a and the first common electrode 106a.

A polarizer 125 is attached on the first substrate 110 and an analyzer 126 is attached on the second substrate 111 in which a polarization direction of the polarizer 125 and a polarization direction of the analyzer 126 are perpendicular to each other.

In the above in-plane switching mode LCD, when the voltage between first data electrode 105a and the first common electrode 106a is not applied, the light is not transmitted in the liquid crystal layer 119 because alignment directions of the first alignment layer 121a and the second alignment layer 121b, and polarization directions of the polarizer 125 and the analyzer 126 are parallel.

Further when the voltage is applied between first data electrode 105a and the first common electrode 106a as shown in FIG. 3b, the electric field is produced between the spacers 130 as shown in FIG. 4b because the first and second data electrodes 105a, 105b and the first and second common electrode 106a, 106b are electrically connected. In other word, since the uniform electric field between the first and second data electrodes 105a, 105b and the first and second common electrode 106a, 106b, the light is transmitted "in the liquid crystal molecules 120" of the liquid crystal layer 119 because alignment directions of the first alignment layer 121a and the second alignment layer 121b, and polarization directions of the polarizer 125 and the analyzer 126 are parallel.

According to the present invention, since the electrodes which create the electric field are formed on the first and second substrates, it is possible to decrease a driving voltage for driving the liquid crystal layer.

Further, the contrast ratio is also increased by parallel alignment of the liquid crystal molecule.

While the described embodiment represents the preferred form of the present invention, it is to be understood that modifications will occur to those skilled in that art without departing from the spirit of the invention. The scope of the invention is therefore to be determined solely by the appended claim.

What is claimed is:

1. A liquid crystal display device, comprising:
   first and second substrates;
   a plurality of gate bus lines and data bus lines crossing each other over the first substrate, the gate bus lines and data bus lines defining a pixel region;
   a plurality of thin film transistors at the cross of the gate bus lines and the data bus lines;
   at least a pair of first data and common electrodes, which are parallel to the data bus lines, forming an electric field in the pixel region;
   a first alignment layer over the first substrate;
   at least a pair of second data and common electrodes forming an electric field on the second substrate;
   a second alignment layer over the second substrate; and
   a liquid crystal layer between the first substrate and second substrate.

2. The liquid crystal display device in accordance with claim 1, further comprising:
   a color filter layer over the second substrate.

3. The liquid crystal display device in accordance with claim 1, further comprising:
   a black matrix over the second substrate.

4. The liquid crystal display device in accordance with claim 1, wherein the first alignment layer includes a polyimide.

5. The liquid crystal display device in accordance with claim 1, wherein the first alignment layer includes a photosensitive material.

6. The liquid crystal display device in accordance with claim 5, wherein the photosensitive material is a polysiloxanefluorocinnamate or polyvinylfluorocinnamate.

7. The liquid crystal display device in accordance with claim 1, wherein the second alignment layer includes a polyimide.

8. The liquid crystal display device in accordance with claim 1, wherein the second alignment layer includes a photosensitive material.

9. The liquid crystal display device in accordance with claim 8, wherein the photosensitive material is a polysiloxanefluorocinnamate or polyvinylfluorocinnamate.

10. The liquid crystal display device in accordance with claim 1, wherein alignment directions of the first alignment layer and the second alignment layer are parallel.

11. The liquid crystal display device in accordance with claim 1, further comprising:

a polarizer attached to the first substrate; and an analyzer attached to the second substrate.

12. The liquid crystal display device in accordance with claim 11, wherein polarization directions of the polarizer and the analyzer are substantially perpendicular.

13. The liquid crystal display device in accordance with claim 1, wherein the first data and common electrodes are corresponding to the second data and common electrodes.

14. The liquid crystal display device in accordance with claim 1, further comprising:

a means for electrically connecting the first data electrode and the second data electrodes, and the first common electrode and the second common electrode.

15. The liquid crystal display device in accordance with claim 14, wherein the means for electrically connecting includes conductive spacers.

16. The liquid crystal display device in accordance with claim 15, wherein the conductive spacers are metal.

17. A liquid crystal display device, comprising:

a first substrate including a plurality of gate bus lines and data bus lines crossing each other over the first substrate, the gate bus lines and data bus lines defining a pixel region, a plurality of thin film transistors at the cross of the gate bus lines and the data bus lines, and a first alignment layer over the first substrate;

a second substrate including a black matrix for preventing the light leakage onto the gate bus line, the data bus line, and the thin film transistor, a color filter layer, and a second alignment layer over the second substrate;

a liquid crystal layer between the first substrate and second substrate; and a means for creating an electric field in the liquid crystal layer.

18. The liquid crystal display device in accordance with claim 17, wherein the means includes at least a pair of first electrodes over the first substrate, and at least a pair of second electrodes corresponding to the pair of first electrodes.

19. The liquid crystal display device in accordance with claim 18, wherein the pair of first and second electrodes are data and common electrodes.

20. The liquid crystal display device in accordance with claim 17, further comprising:

a means for electrically connecting the means for creating an electric field.

21. The liquid crystal display device in accordance with claim 20, wherein the means for electrically connecting is formed between the first electrodes and the second electrodes.

22. The liquid crystal display device in accordance with claim 20, wherein the means for electrically connecting is conductive spacers.

23. The liquid crystal display device in accordance with claim 22, wherein the conductive spacers is metal.

24. The liquid crystal display device in accordance with claim 17, wherein the first alignment layer includes a polyimide.

25. The liquid crystal display device in accordance with claim 17, wherein the first alignment layer includes a photosensitive material.

26. The liquid crystal display device in accordance with claim 25, wherein the photosensitive material is a polysiloxanefluorocinnamate or polyvinylfluorocinnamate.

27. The liquid crystal display device in accordance with claim 17, wherein the second alignment layer includes a polyimide.

28. The liquid crystal display device in accordance with claim 17, wherein the second alignment layer includes a photosensitive material.

29. The liquid crystal display device in accordance with claim 28, wherein the photosensitive material is a polysiloxanefluorocinnamate or polyvinylfluorocinnamate.

30. The liquid crystal display device in accordance with claim 17, wherein alignment directions of the first alignment layer and the second alignment layer are parallel.

31. The liquid crystal display device in accordance with claim 17, further comprising:

a polarizer attached to the first substrate; and an analyzer attached to the second substrate.

32. The liquid crystal display device in accordance with claim 31, wherein polarization directions of the polarizer and the analyzer are substantially perpendicular.

* * * * *

UNITED STATES PATENT AND TRADEMARK OFFICE
CERTIFICATE OF CORRECTION

PATENT NO.   : 5,949,511
DATED        : Sep. 7, 1999
INVENTOR(S)  : Jong Jin PARK It is certified that error appears in the above-identified patent and that said Letters Patent is hereby corrected as shown below:

```
Title page, item [30] FOREIGN APPLICATION PRIORITY DATA:
insert --Nov. 20, 1996 [KR] Korea.......... 55-784/1996--.
```

Signed and Sealed this

Twenty-seventh Day of February, 2001

Attest:

NICHOLAS P. GODICI

Attesting Officer     Acting Director of the United States Patent and Trademark Office